R. L. HUGHENS.
PUSH ROD CONNECTION FOR AUTOMOBILE ENGINE VALVES.
APPLICATION FILED JAN. 17, 1920.

1,379,343.  Patented May 24, 1921.

Inventor
Robert Lee Hughens
by Spear Middleton Donaldson & Hall
Attys.

UNITED STATES PATENT OFFICE.

ROBERT L. HUGHENS, OF ATLANTA, GEORGIA.

PUSH-ROD CONNECTION FOR AUTOMOBILE-ENGINE VALVES.

1,379,343.  Specification of Letters Patent.  Patented May 24, 1921.

Application filed January 17, 1920. Serial No. 352,020.

*To all whom it may concern:*

Be it known that I, ROBERT LEE HUGHENS, a citizen of the United States, and a resident of the city of Atlanta, State of Georgia, have invented certain new and useful Improvements in Push-Rod Connections for Automobile-Engine Valves, of which the following is a specification.

The invention concerns particularly a coupling connection for the push rod of the valves of automobile engines and the invention consists of features and combination and arrangement of parts hereinafter described and particularly pointed out in the claims.

In the accompanying drawings, Figure 1 is a plan view of a part of the cylinder block of an automobile engine with my improvement combined therewith, parts being shown in plan.

Figure 1:
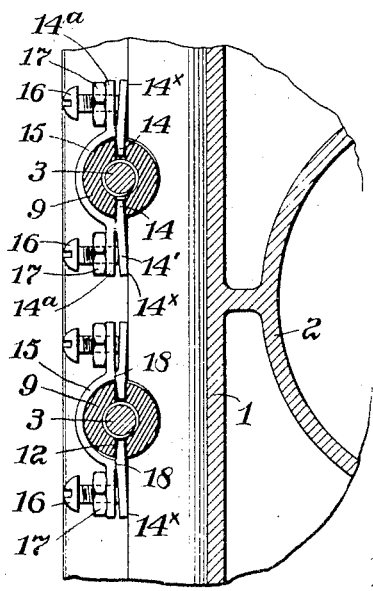
Figure 4:
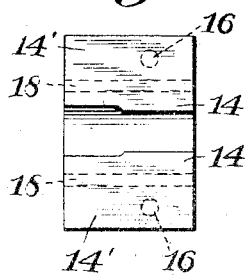
Fig. 4 is a side view of the coupling member.
Figure 2:
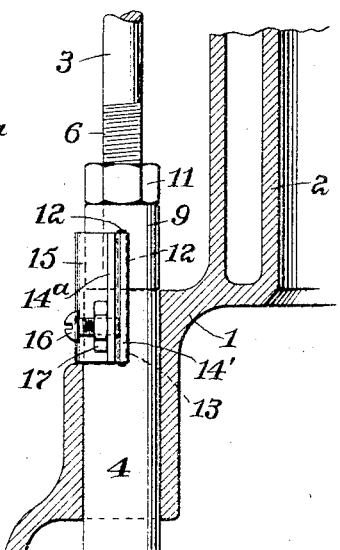
Fig. 2 is a vertical sectional view through a portion of the cylinder block with my improved connection shown in elevation.
Figure 3:
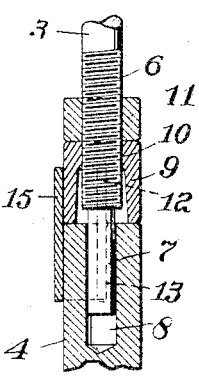
Fig. 3 is a vertical sectional view through the parts of the push rod and the coupling.
Figures 5, 6, 7:
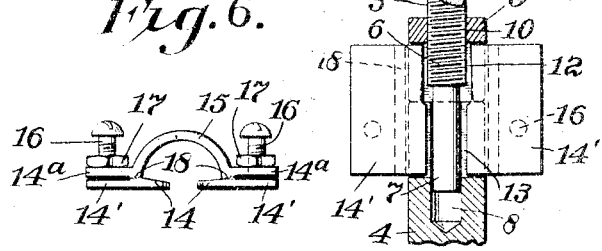
Fig. 5 is a view of the inner side of the coupling member.
Fig. 6 is an end view of the coupling member.
Fig. 7 is a sectional view of the coupling organization taken a quarter turn from the sectional view of Fig. 3.

In these drawings, 1 indicates generally a cylinder block of an automobile engine, 2 indicating a portion of the cylinder. The push rod comprises the rod section 3, which, at its upper end, connects with a suitable rocker for operating the valve and a lower section 4 guided vertically through a portion of the cylinder block and resting at its lower end upon the cam 5 by which the push rod is operated vertically. The upper section 3 has a threaded end 6 with a reduced plain extension 7 fitting in a socket 8 of the lower push rod 4, and on this threaded portion 6 a collar 9 is fitted, this being threaded at 10, and this collar is held in any position at which it may be adjusted by a jam nut 11. The collar is slotted transversely at its lower portion 12 below its threaded part and the upper end of the lower section 4 is also slotted transversely, as indicated at 13. A coupling member shown in Figs. 4, 5 and 6 in detail, is provided with flanges 14 to enter the slots 12 and 13 of the collar 9 and push rod, Fig. 4, respectively, so as to hold these parts against relative turning movement, it being understood that the coupling member slides up and down as the push rod reciprocates. This coupling member has a segmental or curved portion 15 fitting around the collar 9 and its flanges 14 are extended at 14′ to bear on the outer surface of the cylinder block as indicated at 14ˣ, Fig. 1, so as to get a bearing at this point and prevent rattle or looseness of the parts as they are being operated. In order to secure a proper fit of the coupling member with the collar 9 and push rod section 4, and with the bearing surface of the cylinder block, I provide a construction which is adjustable and which will take up any wear or looseness in the parts so that noise due to knocking or rattle will be avoided. For this purpose the coupling is provided with the ears or flanges 14ᵃ overlying the extensions 14′ and carrying adjusting screws 16 to bear on the flanges or extensions 14′ and press them inwardly so as to get the proper bearing at the point 14ˣ on the face of the cylinder block. These screws when adjusted are held by jam nuts 17. It will be observed that the flanges 14′, together with the lips or flanges 14 are connected with the main body of the coupling by a narrow portion at 18. This may be done by spot welding the base piece or flange 14, 14′ to the main portion at the point 18. By adjusting the screws 16 not only can slackness or wear be taken up to secure a firm bearing at the point 14ˣ, Fig. 1, but the lips or flanges 14 will also take up any looseness in the coupling by engaging the collar or sleeve 9 and also the wall of slots 13 in the push rod section 4. In effect, the connection at 18, Fig. 3 is a pivotal one between the base flange 14, 14′ and the main body of the coupling so that by adjusting the screws 16 the base portion 14, 14′, will be rocked on the point 18 as a pivot, and the proper adjustment can thus be effected. From the above, it will be seen that an adjustable push rod connection between the cam 5 and the rocker of the valve is provided, also that the two rod sections 3 and 4 are held against relative rotary displacement so that the lower end of the rod 4 will be properly presented with its curved end 4ˣ to the eccentric and the connection between the rod 3 and rocker will not be subject to undue strain and this effect is secured by the coupling member engaging the lower rod section and the collar 9, and also the coupling member by bearing against the outer face of the cylinder block and by engaging the members of the rod connection, will hold all the parts properly in working relation without looseness which would cause noise and undue wear, and also that any wear that takes place may be taken up by adjusting screws 16.

What I claim is:

1. A push rod connection for automobile valves comprising push rod sections, an adjustable connection between them and a coupling member having flanges engaging parts of the push rod sections and other flanges engaging the outer face of the cylinder block, with means for adjusting the said coupling member to take up looseness in the connection, substantially as described.

2. In combination with a lower push rod section, for automobile valves, an upper push rod section, a collar screw threaded on the upper section, a jam nut for holding said collar, and a coupling member having a main portion to embrace the said collar and flanges to enter slots in the collar and lower rod section, and a part to bear on the cylinder block and means for adjusting the coupling member to take up slack between itself and the cylinder block.

3. A coupling member for sections of the push rod of valves of automobile engines having a portion to engage the push rod sections and a portion to slidably engage the face of the cylinder block and means for adjusting the coupling to take up slack in its engagement with the rod sections and with the cylinder block.

4. A coupling member for sections of the push rods of valves of automobile engines having a substantially semi-circular main portion, base portions projecting inwardly and outwardly in relation to the said main portion and means for adjusting said base portions by giving them substantially a rocking action in relation to their point of connection with the main portion whereby said coupling will take up looseness in its sliding engagement with the cylinder block and in its engagement with parts of the push rod connection, substantially as described.

5. A coupling member for the sections of a push rod of automobile engine valves comprising a main portion to embrace portions of the said rod sections and base portions presenting inwardly extending flanges to engage portions of the said sections and outwardly extending flange portions to bear on the cylinder block, ears or flanges overlying said outwardly extending flange portions and screws passing through the said ears and bearing on the base portion to adjust the outer flanges one way and the inner flanges the other way, said base portions being connected at their intermediate points with the main portion, substantially as described.

6. In a gasolene engine, the combination with the frame thereof, of valve actuating mechanism including a push-rod divided into two axially alined parts, the adjacent ends of said parts having keyways therein, and means for detachably connecting said parts together and for preventing rotation of the push rod, said means consisting of an integral member having keys registering with said keyways and bearing members located on both sides of said push-rod and in sliding engagement with the said frame.

In testimony whereof I affix my signature.

ROBERT L. HUGHENS.